United States Patent [19]
Gandia

[11] 3,951,529
[45] Apr. 20, 1976

[54] ILLUMINATED SIGNS USING STROBOSCOPIC MEANS FOR ANIMATION ALONG A VEHICLE PATHWAY

[76] Inventor: Ricardo Tarrega Gandia, 1, Av. Mohamed Resza Shah, Teheran, Iran

[22] Filed: Feb. 11, 1974

[21] Appl. No.: 441,281

[52] U.S. Cl. .................................................. 352/100
[51] Int. Cl.² ........................................... G03B 25/00
[58] Field of Search ...................... 352/100, 200, 87; 40/52 R, 125 D, 125 L, 130 L, 132 D

[56] References Cited
UNITED STATES PATENTS

| | | | |
|---|---|---|---|
| 917,587 | 4/1909 | Good | 352/100 |
| 978,854 | 12/1910 | Czernieski | 352/100 |
| 2,299,731 | 10/1942 | Arendt | 352/100 |
| 2,319,287 | 5/1943 | Arendt | 352/100 |
| 2,493,795 | 1/1950 | Wikkenhauser et al. | 352/200 X |
| 3,694,062 | 9/1972 | Koenig | 352/100 |
| 3,704,064 | 11/1972 | Sollogoub et al. | 352/100 |
| 3,743,396 | 7/1973 | Odone | 352/200 X |

FOREIGN PATENTS OR APPLICATIONS

| | | | |
|---|---|---|---|
| 451,196 | 7/1936 | United Kingdom | 40/52 R |

*Primary Examiner*—L. T. Hix
*Assistant Examiner*—Alan Mathews
*Attorney, Agent, or Firm*—Abraham A. Saffitz

[57] ABSTRACT

Apparatus for the transmission of visual information, comprising: a longitudinal row of spaced apart pictures, each picture containing separated animated figures in a frame depicting separated illuminated phases of a movement of the animated figures along a vehicle pathway, and a stroboscopic illumination means mounted in a fixed relation to the frame to sequentially illuminate each picture, variable control switch means energizes the stroboscopic illumination means to turn on illumination independently of moving in the vehicle along the vehicle pathway, and is adjustable for flashing periodically on and off at a rate between about 80 cycles per second and 100 cycles per second, the light pulses which illuminate each picture having a duration which is approximately a tenth of the viewing period for the selected picture of the moving viewer in said vehicle.

1 Claim, 5 Drawing Figures

ILLUMINATED SIGNS USING STROBOSCOPIC MEANS FOR ANIMATION ALONG A VEHICLE PATHWAY

The present invention refers to an installation for the transmission of visual information, comprising a number of single pictures, arranged in an interspaced row, said pictures containing individual succeeding phases of a movement. The invention refers also to a process of operation of the above mentioned installation.

PRIOR ART

In the past, it has been proposed in U.S. Pat. No. 3,694,062 to arrange panels along roads or railway routes, which panels contain pictures of advertising, entertaining or educational content. It is not sufficient to arrange a row of pictures containing the single phases of a movement along a road in order to create a sort of "movie effect", when e.g. a passenger in a car passes along this row, as for example in U.S. Pat. No. 917,587. It has been known for a long time that it is necessary to provide means to effect a periodic appearance and disappearance of each picture in the row in accordance with a predetermined cyclical pulse rate depending upon the vehicle speed to obtain the desired effect.

There have been made a number of proposals in the past in order to achieve stroboscopic illumination. For instance, in French Pat. No. 1.008.912, there is described a row of interspaced picture panels, each panel comprising a number of shields arranged longitudinally in front of the picture on the panel, whereby the planes of said shields converge a common line, which the viewer is going to pass. Another possibility consists in providing stroboscopic illumination means as in U.S. Pat. No. 917,587, which intermittently illuminate each picture of the row in a predetermined sequence.

The disadvantage of the first named solution is that a viewer has to pass exactly a predetermined path in order to be able to see the movie effect, while the disadvantage of the second named solution lies in the fact, that it is necessary to precisely synchronize the illumination sequence of the illumination means with the speed of the moving viewer. In turn, this requires complicated synchronization means rendering the whole installation quite expensive.

On the other hand, the realization of such a movie system which is simple, reliable and inexpensive, would be very interesting, e.g. for advertising purposes to influence millions of people which daily use for instance a subway on the way to their working place. Because of the highly complicated nature of such systems, they have not been widely used in the past.

OBJECTS OF THE INVENTION

It is an object of the present invention to propose an installation for the transmission of visual information which simplifies the above complex synchronizing methods and permits independent illusion of movement without any means for synchronizing comprising a number of single pictures aranged in an interspaced row, said pictures containing individual, succeeding phases of a movement, and further comprising illumination means for each picture, which installation is simple in construction, reliable in use and relatively inexpensive.

A further object of the invention is to provide such a system which may be installed along the walls of a tunnel of a subway.

A further object of the invention is to provide such a system which does not require complicated and expensive synchronization means to exactly synchronize the illumination sequence with the speed of a moving viewer Still another object of the invention is to provide a process for its operation in order to create the illusion of moving pictures for a moving viewer.

According to the invention, the installation of the kind as mentioned above comprises adjustable control means connected to the illumination means which periodically switch on and off said illumination means.

The process according to the invention is characterized by the fact, that each picture is illuminated by light pulses, the duration of which being not more than a tenth of and the number of which being not less than ten in the viewing period of a moving viewer.

By way of example, a realization of the invention in practice will now be further described.

FIGURES OF THE DRAWING

DESCRIPTION OF THE PREFERRED EMBODIMENT

Figure 1:
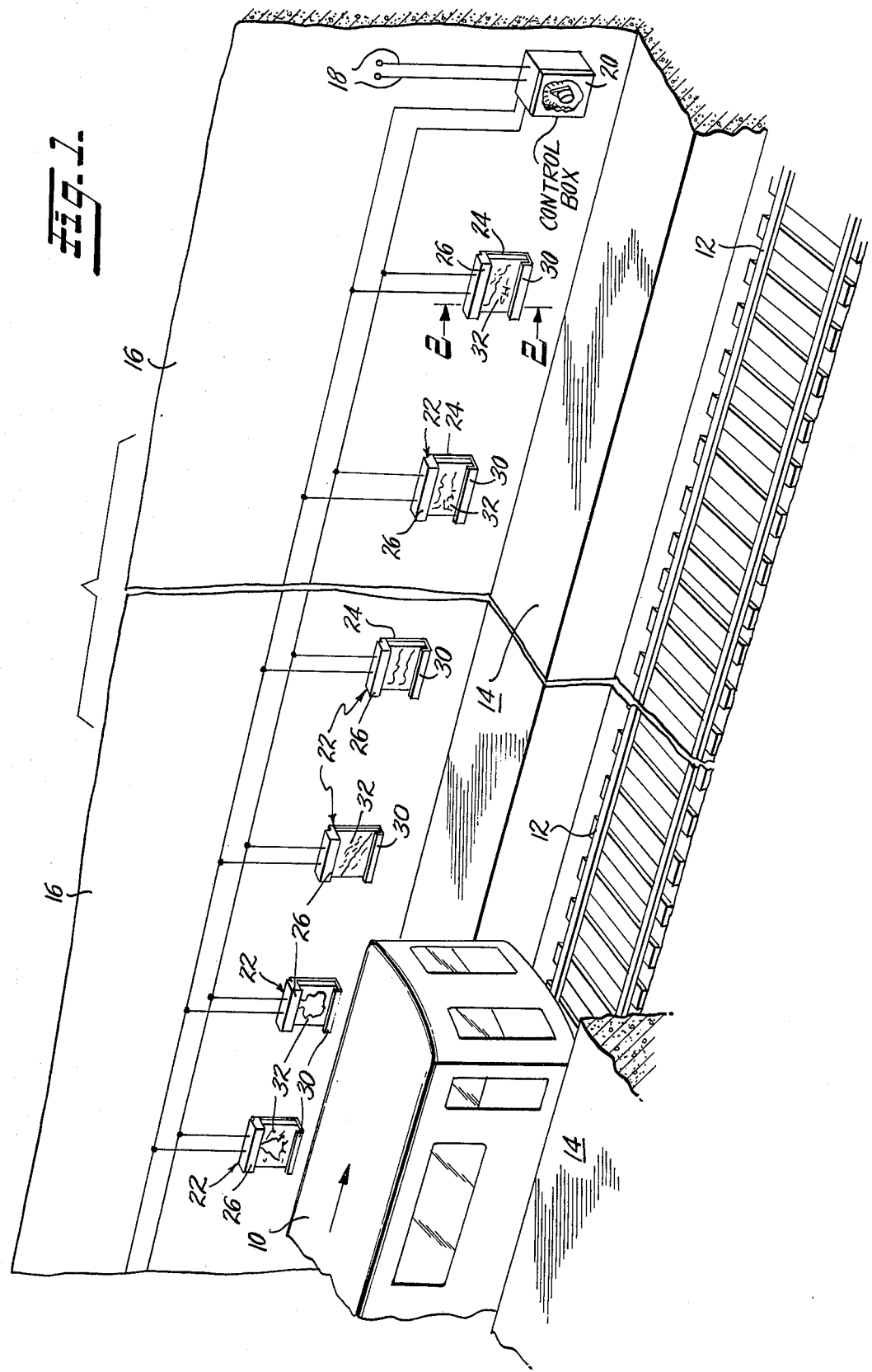
FIG. 1 is a diagrammatic perspective view of a series of display units arranged according to the present invention.

In the following example, and as shown in FIG. 1, the subway is shown as the vehicle pathway, but it is evident that the application of the invention is possible in many other ways, e.g. railway, car roads etc.

Figure 2:
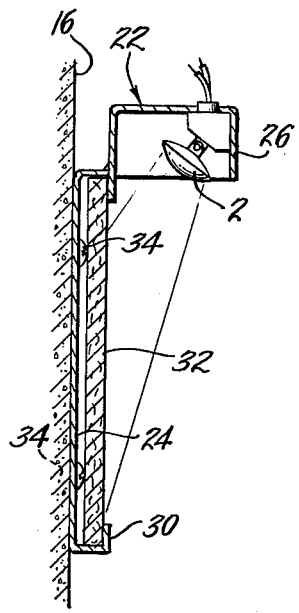
FIG. 2 is an enlarged fragmentary vertical sectional view through one of the display units taken on the line 2—2 of FIG. 1.
Figure 3:
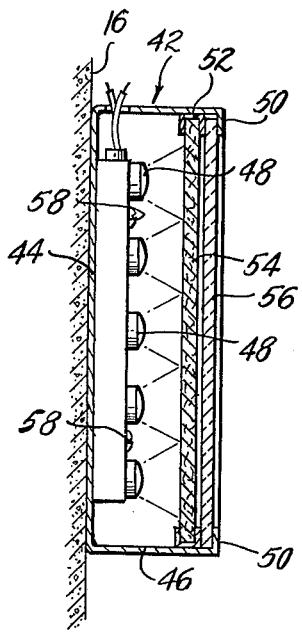
FIG. 3 is a sectional view, similar to FIG. 2 of a modification of the display unit.
Figure 4:
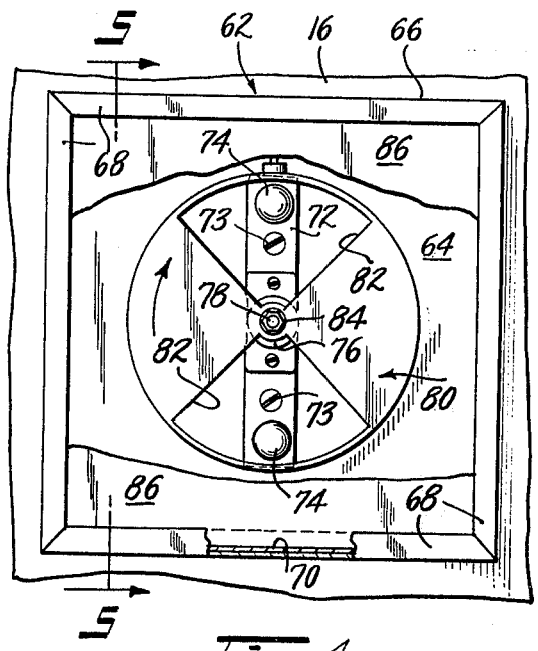
FIG. 4 is a fragmentary elevational view of another modified form of display unit.
Figure 5:
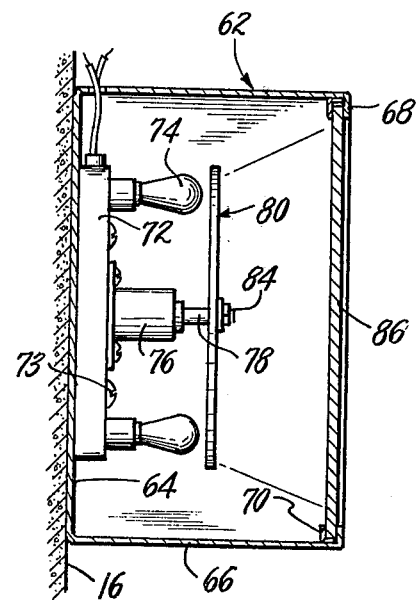
FIG. 5 is a vertical sectional view taken on the line 5—5 of FIG. 4.

It is well known that the speed of the subway train is controlled automatically and to a certain degree for reasons of economy and safety. After having left a station platform 14, the train is accelerated for a certain time, until a preselected cruising speed is reached. The cruising speed is then maintained at a constant level for a certain time until a slow-down point is reached, where a deceleration of the train begins, until the next station is reached. A certain, well known length of the way of the train therefor is passed with a constant and known speed. Along this pathway, and as shown in FIG. 1, there are arranged a row of pictures either embodiments 22 in FIG. 2, 32 in FIG. 3, 42 in FIG. 4, or 86 in FIG. 5 on the tunnel wall 16 at the same height as the windows of the train 10. For example, the width of the pictures can be 1 m and the distance between the individual pictures also 1 m. The pictures 22, 32, 42, or 86 contain individual animated poses, in the direction of movement (See arrow, FIG. 1) of the train depicting succeeding phases of a movement. Each picture can be of transparent material 56 as shown in FIG. 3 and is preferably arranged in a frame fixed to the tunnel wall to enable an easy exchange of them. Within the frame and behind the picture is a light source stroboscopically operated as in 48, FIG. 3 which effects an illumination of the picture. Either all light sources, or at least a part of them are connected to a common control box 20 which effects the on and off switching of the light sources. We now suppose that the train passes along the picture row with a more or less constant speed of 20 meters per second. In this case, a viewer in the train will see a number of pictures, and while observing each picture the lighting by the stroboscope will provide 10 pulses so that the impression is of 10 pictures per second but with a single picture or, estated in a different manner, he has a time of 1/10 second to view each picture. If he moves from the first picture to the 10th picture and views each picture in 1/10 second, obviously at a speed of 20 meters per second it is impossible or difficult for the viewer to concentrate on a single picture 20 meters behind him and the viewer gets a good illusion of movement as a result of the 1/10 second pulses. According to the invention, the common control box is now adjusted so that in viewing period of 1/10 second, each picture is illuminated approximately 10 times. This in turn means the on-and-off frequency of the control box is 100 cps.

The light source for each picture can be constructed in the manner shown in the embodiments of FIGS. 2, 3, 4 and 5. For example, in FIG. 3 there is provided a gas discharge tube 48 with the associated control means 20 to form a stroboscope, the frequency of which is controlled by the common control box 20. Another embodiment shown in FIGS. 5 and 6 consists in providing a continuously glowing bulb 74 in front of which a rotatable disc 80 is arranged, which is provided with a plurality of slots 82 to provide pulses of light with a duration of 1/10 second. In this case, the common control box is used to influence the rotation speed of the slotted disc 80 by controlling the rate of rotation of the shaft 78; the control box is bolted by fastening means to wall 16 and the disc 80 and slots 82 rotate at a rate which permits illuminating transparent pictures 86 in pulses of 1/10 second duration.

With the installation as described above, it is no longer necessary to exactly synchronize the speed of the moving viewer with the pulse rate of the illumination of the pictures to get the illusion of movement. The theoretically known moving speed of the viewer can, in practice, vary within certain limits without any noticeable influence on the effect of the "movie illusion".

With the installation as illustrated in FIGS. 2–5 and described above, it is possible to effect an easy and instant adaptation to varying demands. The pictures 22, FIG. 1, 32, FIG. 3, 42, FIG. 4 and 86, FIG. 5 can easily be exchanged in their frames formed by flanges 30, FIG. 1, flanges 50, FIG. 3, with U-retainer 52 or flange 68, retainer 70 in FIG. 5 by simply pulling them out and pushing the new pictures in the frame. If the crusing speed of the train is changed, it is very simple to adapt the installation by varying the setting of the common control box according to the new speed.

Of course, the inventon can be used in other vehicle pathways such as in tunnels of ordinary railways or even in open field, if the pictures are suitably shielded against the sun.

Thus, as seen in the illustrated preferred embodiments, the illumination means are actuated only by the control box at a preselected rate. This rate will be determined when the whole installation is planned, taking into account the size of the pictures, the distance between the pictures and the approximate vehicle speed, then the control box is adjusted accordingly. Due to the fact that the illumination period for one single picture is so short that the picture will be flashed approximately ten times in the viewing period, variations in vehicle speed do not substantially affect the illusion of the moving pictures.

The main problem solved with the present invention is to make such installation independent of control means that have to be actuated by the vehicle passing the pictures.

The selection of the particular embodiment of installation can be adapted because of economy and availability of standard component parts. For example, if the lighting along the vehicle pathway is such that the viewer can obtain a best image of the illuminated pictures in the longitudinal row of spaced apart pictures under high intensity illumination which is of the type shown in FIG. 3 herein, then the embodiment of FIG. 3 can serve for illuminating the transparent picture under the control of the control means. In other applications it may be necessary to utilize the simple add-on light structure afforded in FIG. 2 where reflected illumination is effected by virtue of the placement of the high intensity light in the light housing 26 which is fitted in the bracket at the top of the display unit to illuminate the sign. Where strong cross lighting occurs this simple illumination system under the control of the control means effecting stroboscopic interruption provides an excellent animated display adjustability for flashing periodically on and off at a rate between 80 cycles per second and 150 cycles per second. In those instances where incandescent bulbs in conventional porcelain sockets are available and one wishes to rely upon the adjustment of the disc 80 at the proper rotational speed to provide a periodic flashing between 80–150 cycles one can utilize to good advantage the embodiment of FIG. 5.

What I claim is:

1. Apparatus for the transmission of visual information by intermittent illustration of status pictures viewed in a moving vehicle along a vehicle pathway, comprising:

the combination of a longitudinal row of substantially equally spaced apart pictures each in a frame, each picture containing separated animated figures in said frame depicting separated illuminated phases of a movement of the animated figures along said vehicle pathway;

a stroboscopic illumination means mounted in a fixed relation to each frame to sequentially illuminate each picture;

a variable control switch means for energizing and actuating said stroboscopic illumination means to sequentially turn the illumination on and off and provide about 80 to 100 flashes of light for each picture per second so that the light pulses which illuminate each picture have a duration which is approximately one eight to about one tenth of one tenth of a second of viewing period of the moving viewer in said vehicle;

said switch means including an adjustable clock and a pulse generator;

said stroboscopic illumination means comprising a strobe light energized by said clock and pulse generator; and, said strobe light being mounted on each frame to uniformly illuminate the animated figures in the frame during the viewing period.

* * * * *